(12) United States Patent
Winzer et al.

(10) Patent No.: US 9,977,310 B2
(45) Date of Patent: May 22, 2018

(54) MULTI-ELECTRODE PHOTONIC DIGITAL TO ANALOG CONVERTING VECTOR MODULATOR

(71) Applicant: Alcatel-Lucent USA Inc., Murray Hill, NJ (US)

(72) Inventors: Peter J. Winzer, Aberdeen, NJ (US); Chandrasekhar Sethumadavan, Old Bridge, NJ (US); Gregory Raybon, Shrewsbury, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 470 days.

(21) Appl. No.: 14/202,703

(22) Filed: Mar. 10, 2014

(65) Prior Publication Data

US 2016/0139485 A1    May 19, 2016

(51) Int. Cl.
*G02F 1/225* (2006.01)
*H04B 10/556* (2013.01)
(Continued)

(52) U.S. Cl.
CPC .......... *G02F 1/2257* (2013.01); *G02F 1/2255* (2013.01); *G02F 7/00* (2013.01);
(Continued)

(58) Field of Classification Search
CPC .............................. G02F 2001/212; G02F 7/00
See application file for complete search history.

(56) References Cited

U.S. PATENT DOCUMENTS 7,382,943 B1 * 6/2008 Heaton ................. G02F 1/2255
                                                                    385/3
8,295,710 B2    10/2012 Marcus
(Continued)

FOREIGN PATENT DOCUMENTS

EP          0 319 286 A2      11/1988
TW          320689            11/1997
(Continued)

OTHER PUBLICATIONS

Ehrlichman et al. ("A Method for Generating Arbitrary Optical Signal Constellations Using Direct Digital Drive", Journal of Lightwave Technology, vol. 29, No. 17, Sep. 1, 2011, pp. 2545-2551).*
(Continued)

*Primary Examiner* — Michelle R Connelly
(74) *Attorney, Agent, or Firm* — Hassan Shamsaei Far

(57) ABSTRACT

A digital-electronic-to-analog-optical converter, which has a structure consistent with a super-Mach-Zehnder interferometer, and which can perform the functionalities of both a Digital to Analog Converter (DAC) and a digital modulator uses a sub-Mach-Zender modulator to modulate optical wave signals propagating through its optical waveguide in a push-pull manner. The modulation performed is phase modulation realized with electrodes positioned near the optical wave guide where such electrodes carry modulation signals in digital, analog or discrete time signal format creating electromagnetic or electric fields that engage the optical wave signals traveling through the waveguide thus imparting a phase shift onto the optical wave signals. The amount of the phase shift can be implemented through the geometry of the electrodes, the length of time the modulating signal is applied, and the amplitude of the modulating signal.

6 Claims, 6 Drawing Sheets

(51) Int. Cl.
*H04B 10/50* (2013.01)
*H04B 10/54* (2013.01)
*G02F 7/00* (2006.01)
*G02F 1/21* (2006.01)

(52) U.S. Cl.
CPC ....... *H04B 10/5053* (2013.01); *H04B 10/541* (2013.01); *H04B 10/556* (2013.01); *G02F 2001/212* (2013.01)

(56) References Cited

U.S. PATENT DOCUMENTS

| | | | |
|---|---|---|---|
| 8,472,847 | B2 | 6/2013 | Kayahara |
| 2007/0212076 | A1 | 9/2007 | Roberts et al. |
| 2011/0044573 | A1* | 2/2011 | Webster ................ G02F 1/0121 385/3 |
| 2011/0064351 | A1 | 3/2011 | Kise et al. |
| 2011/0129230 | A1 | 6/2011 | Zanoni et al. |
| 2012/0163831 | A1 | 6/2012 | Eiselt |
| 2012/0213531 | A1 | 8/2012 | Nazarathy et al. |
| 2012/0251032 | A1* | 10/2012 | Kato ..................... G02F 1/0327 385/3 |

FOREIGN PATENT DOCUMENTS

| | | |
|---|---|---|
| TW | 200606481 A1 | 2/2006 |
| WO | WO 2012/163419 A1 | 12/2012 |

OTHER PUBLICATIONS

Ehrlichman, Yossef et al., "A Method for Generating Arbitrary Optical Signal Constellations Using Direct Digital Drive", J. of Lightwave Technology, vol. 29, No. 17, Sep. 1, 2011, pp. 2545-2551.

Yamazaki, Hiroshi et al., "Dual-carrier Dual-polarization IQ Modulator Driven with High-speed DACs for 400-Gb/s Applications", 2012 38th European Conference and Exhibition on Optical Communications, Sep. 16, 2012, pp. 1-3.

Godin, Jean et al., "High Speed Multi-Level Drivers for Spectrally Efficient Optical Transmission Systems", Bell Labs Technical Journal, vol. 18, No. 3, pp. 67-94.

Winzer, Peter J. et al., "Advanced Optical Modulation Formats", Proceedings of the IEEE, vol. 94, No. 5, May 2006, pp. 952-985.

PCT International Search Report, PCT/US2015/017011, International Filing Date Feb. 23, 2015, 5 pgs.

Evans, P. et al., "Multi-Channel Coherent PM-QPSK InP Transmitter Photonic Integrated Circuit (PIC) Operating at 112 Gb/s Per Wavelength", Infinera Corporation, Sunnyvale, CA, pevans@infinera.com, 3 pages.

Document No. WP-CT-10-2012, "Coherent DWDM Technologies", White Paper, Infinera Corporation, Sunnyvale, CA, 2012, pp. 1-15.

McGhan, D. et al., "5120 km RZ-DPSK transmission over G652 fiber at 10 Gb/s with no optical dispersion compensation", Optical Society of America, PDP27, 2005, 3 pgs.

\* cited by examiner

U.S. 9,977,310 B2

MULTI-ELECTRODE PHOTONIC DIGITAL TO ANALOG CONVERTING VECTOR MODULATOR

FIELD OF THE INVENTION

The present invention generally relates to optical communications and specifically to a device for modulating an optical wave using digital modulation techniques.

BACKGROUND OF THE INVENTION

In optical communication systems, digital to analog conversion (DAC) is an important feature of modern high speed optical transponders that are used for various purposes including the generation of higher order modulation formats (e.g., Quadrature Amplitude Modulation or QAM), digital pulse shaping (Nyquist pulses, root raised cosine pulse shaping), or the pre-distortion of transmit signals to compensate for certain transmission impairments (e.g., fiber nonlinearity) that occur within optical fiber media. At the transmission end of many optical communication systems that use digital modulation techniques, DACs are used as part of the modulation circuitry. Typically, the circuit architecture used for many such digital modulation circuitry comprises a Digital Signal Processor (DSP) that is closely coupled to a DAC, which in turn is coupled to a digital modulator such as an I/Q (In-phase/Quadrature phase) modulator. This DSP/DAC/I/Q Modulator architecture when used in relatively high-speed optical systems presents several problems.

First, the interface between the DSP and the DAC typically handles signals having aggregate speeds on the order of multi-Terabits/second. As a consequence of the speeds involved, the design of such circuits is technically challenging because of the complexity of such circuits and their relatively high power consumption. To address the power consumption needs of these circuits, CMOS (Complementary Metal Oxide Semiconductor) technology is used in implementing them as such technology is known for its low power consumption. Typically, the DSP used is an ASIC (Application Specific Integrated Circuit) that can process multi-Terabits/second aggregate signal streams. Furthermore, in order to apply the proper signal levels to the input of the optical modulators, driver amplifiers with reasonably linear characteristics are required to avoid the distortion that these analog signals would otherwise experience. Such linear drivers are generally expensive and it would be desirable to replace them with saturated non-linear drivers, or even more desirable to omit their usage altogether. Previous attempts to reduce the need for high speed DACs and associated linear electronic driver amplifiers have been made by shifting portions of the DAC functionality into the optical modulator. However, this approach increases the number of modulator circuits needed and requires significantly more difficult bias controls, phase adjustments and optical/electrical path matching when compared to the DSP/DAC/IQ architecture discussed above. Three examples of this approach are discussed below and two of them are shown in FIGS. 1, 2 and 4.

In FIG. 1, a quadruple-nested Mach-Zehnder modulator (MZM) is shown where an optical wave is inputted into an optical waveguide arranged as per the well known tree-like Mach-Zehnder structure; see [1] A. Chiba, et al. 16-level quadrature amplitude modulation by monolithic quad-parallel Mach-Zehnder optical modulator. *Electron. Lett.*, 46:227-228, 2010. [2] H. Yamazaki, et al. 64QAM modulator with a hybrid configuration of silica PLCs and LiNb03 phase modulators for 100-Gb/s applications. *Proc. European Conf. on Opt. Commun. (ECOC)*, paper 2.2.1, 2009. [3] T. Sakamoto, et al. 50-km SMF transmission of 50-Gb/s 16 QAM generated by quad-parallel MZM. *Proc. European Conf. on Opt. Commun. (ECOC)*, paper Tu.1.E.3, 2008.

The inputted optical wave is split into two paths leading to upper and lower arms of the Mach-Zehnder structure. The upper and lower arm each are split into four paths each of which has a modulator positioned proximate the optical waveguide to impart a phase shift to the optical wave by applying voltage to the wave guide at appropriate time instances. The application of a voltage generates an electric or electromagnetic field, which interacts with the optical wave traveling through the waveguide causing the wave to be slightly delayed which delay represents a phase shift. Although not shown, each of the modulators has at least one electrode mounted proximate the wave guide and each modulator applies the modulation voltages through its electrode(s).

FIG. 2 depicts the basic Mach-Zehnder arm structure wherein an optical waveguide is channeled through a substrate of a crystalline material such as Lithium Niobate ($LiNbO_3$) or semiconductor materials such as Gallium arsenide (GaAs) and Indium Phosphide (InP). The phase modulators are positioned proximate a portion of the waveguides and the optical waves from each branch are coupled to or interfere (constructively and/or destructively) with each other at a Y-branch coupler; the light then travels to the output where it typically enters a fiber optic medium for transmission over a network.

FIG. 3 depicts a typical signal constellation for a 16-QAM modulator, which can be implemented with the quad-parallel Mach-Zehnder (MZM) modulator discussed above. FIG. 4 shows another type of optical modulator with DAC functionality commonly referred to as an electro-absorption modulator; see [4] *Advanced Optical Modulation Modulation Formats*; PROCEEDINGS OF THE IEEE|Vol. 94, No. 5, May 2006, pp. 952-985, Winzer, Peter J.; Essiambre, René-Jean; see also [5] C. R. Doerr et al. Monolithic InP 16-QAM modulator. Proc. Opt. Fiber Commun. Conf. (OFC), paper PDP20, 2008. Here the waveguides are channeled through a PIN (Positive-Intrinsic-Negative) material. PIN describes a process of doping three layers of semiconductor material. As the voltages are applied by the modulators, the bandgap of the PIN material is modulated causing the optical signal absorption properties of the material to vary in accordance with the modulation signal. As a result, the intensity of the optical wave changes in accordance with the applied modulation voltage signals.

Another example of the state of the art wherein DAC and modulator functionalities are merged is given in [6] Y. Ehrlichman et al., J. Lightwave Technol. 29(17), 2545 (2011); see also, [7] http://www.ieee802.org/3/100GN-GOPTX/public/nar12/plenary/dama_01_0312_NG100GOPTX.pdf. Here a single (dual-drive) Mach-Zehnder modulator is used and the electrodes in each arm are arranged strictly in a power-of-two length arrangement; that is each electrode length is doubled as compared to the previous positioned electrode. Driving each electrode with equal amplitude binary signals (e.g., +voltage and no voltage signal) generates phase shifts proportional to the electrode lengths in each arm thus converting the digital multi-electrode drive signals to a single analog phase shift per arm. The phase shifted signals in each arm interfere (destructively and/or constructively or both) with each other at the output coupler resulting in a complex-valued analog optical signal. While this modulator is mainly applicable to PAM (Pulse Amplitude Modulation) and in principle is capable of generating a large variety of optical waveforms, it suffers from chirp problems, which is typical of Mach Zehnder modulators. A chirp is an undesired residual phase modulation that can lead to signal distortion. A chirped signal is characterized by an unwanted optical phase modulation accompanying the intentional modulation of amplitude and/or phase. Furthermore, it is known that the bandwidth of an electrode depends on its length. Relatively short length electrodes have generally relatively wider bandwidths. Conversely, relatively longer electrodes have generally relatively narrower bandwidths. Hence, implementing different-length electrodes results in different bandwidths for the individual digital electronic bits to be converted to the analog optical domain, which causes non-linear (and thus difficult to equalize) signal integrity problems.

BRIEF SUMMARY OF THE INVENTION

The present invention provides a digital-electronic-to-analog-optical converter that performs the functionalities of a digital to analog converter and a digital modulator in processing optical wave signals. The converter of the present invention is flexible in that the modulation signal used for the phase modulation of optical wave signals can be an analog, digital or discrete time signal.

The converter of the present invention comprises two main waveguide paths coupled to each other at a start point and at an end point where each main waveguide path comprises a coupled pair of sub-paths having a first common end and a second common end, which are connected to the start point and end point respectively. The converter further comprises a plurality of modulating signal emitters positioned proximate the sub-paths to modulate an optical wave signal traveling within the sub-path pairs with differential signals generated by either a differential signal source or the position of the modulating signal emitters relative to the sub-paths. Portions of the optical wave signal travel from the start point through the pair of sub-paths to the end point and said portions interfere (destructively, constructively, or in any suitable intermediate manner) with each other at the end point. The modulation resulting from either the differential signals or the positioning of the modulating signal emitters can be a phase modulation of the optical wave signal.

A transmit signal processor is connected to each of the modulating signal emitters each of which has its own geometry that can be adjusted such that the bandwidth of all the modulating signal emitters are substantially equal to each other. The transmit signal processor generates a modulating signal which is emitted as a differential signal by the modulation signal emitters to impart a modulation (e.g., phase shifts) to the optical wave signal traveling through the sub-paths. The levels of the differential modulating signal can be adjusted to modulate the phase of the optical wave signal so as to obtain various types of phase shifts (e.g., power-of-two phase shifts) within each of the sub-paths irrespective of the geometries of the modulating signal emitters. The phase modulation caused by the modulating signal emitters can be realized through the following various parameters: the geometry of the modulating signal emitters, the length of time the modulating signal is emitted by the modulation signal emitters, and the amplitude level of the modulating signal. Any one or any combination of two or more of the mentioned parameters can be used to impart a phase shift to the optical wave signal traveling through the sub-paths.

In one embodiment, the converter of the present invention has a structure that is consistent with an I/Q super-Mach-Zehnder interferometer whose upper (I) and lower (Q) arms (or waveguide paths) are put into quadrature (90° out of phase with each other) with the use of a 90° bias electrode. Each of the arms of the I/Q super-Mach-Zehnder comprises a sub-Mach-Zehnder modulator implemented as a chirp free push-pull modulator either through the use of inverted drive signals for the electrodes or through the design and positioning of electrodes, which emit the modulation signals and which are positioned proximate the waveguide paths of the sub-Mach-Zehnder modulator.

In particular a Digital Signal Processor (DSP) generates the modulation signals, which are passed through differential driver amplifiers whose outputs are connected to the electrodes positioned proximate each of the waveguide paths of each sub-Mach-Zehnder modulator. The outputs of the differential driver amplifiers provide balanced modulation signals (i.e., differential signals) that are inverted with respect to each other to provide a the push-pull type signal. The modulation signals from the DSP can be digital, analog, or discrete time signals obtained from sampling an analog signal. In another embodiment, the DSP can generate the differential signals eliminating the need for the differential driver amplifiers. The electrodes can be designed such that their bandwidths can be made substantially equal to each other, and thus can be linearly equalized as needed. Different digital drive signal levels can be used to obtain a chain of power-of-two phase shifts within each modulator irrespective of individual lengths of the electrodes. Any other suitable electrode ladder with non-power-of-two ratios may be constructed as well.

When the modulation signal is a digital signal, a quantization bit can be generated using several electrodes so that multiple electrodes contribute to the phase shift of that one quantization bit. Because several electrodes can be combined to generate the voltage level of one quantization bit, the need for differential amplifiers can be eliminated. As a result, relatively low power consumption technologies such as CMOS technology can be used to construct the modulator and the overall digital-electronic-to-analog-optical converter.

DETAILED DESCRIPTION

Figure 1:
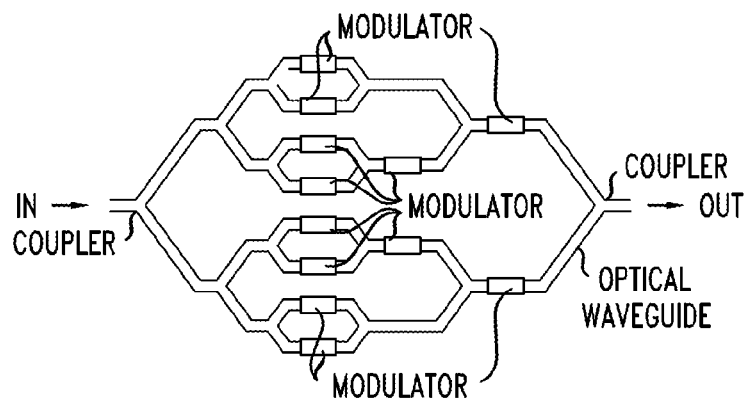
FIG. 1 shows a prior art interference modulator using a quad-parallel Mach-Zehnder tree structure.
Figure 2:
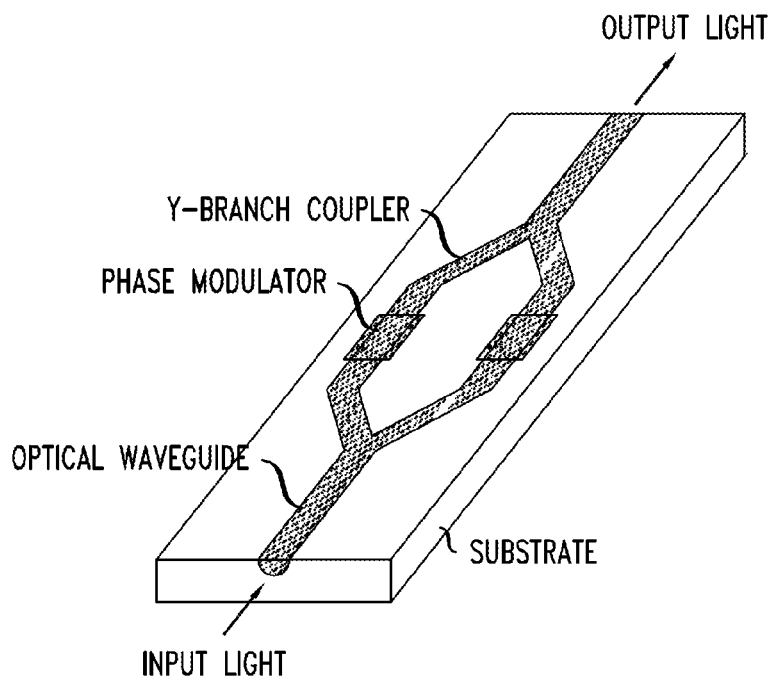
FIG. 2 is a prior art depiction of an actual arm of a Mach-Zehnder tree structure.
Figure 3:
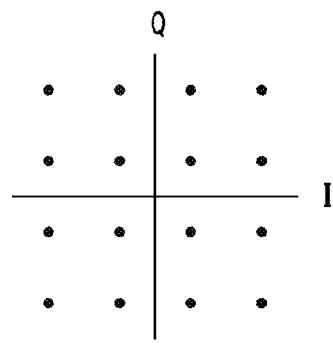
FIG. 3 shows a 16-QAM signal constellation as generated by modulators of FIGS. 1 and 2.
Figure 4:
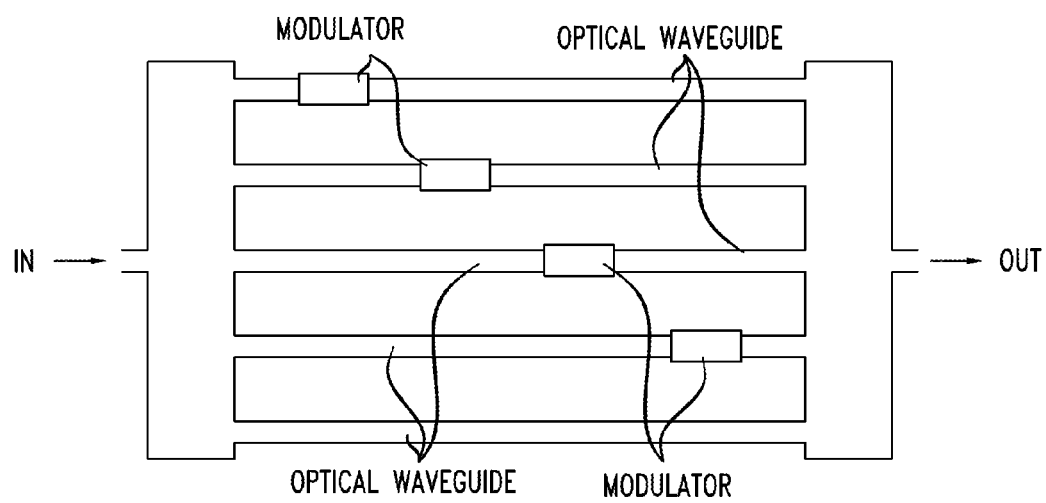
FIG. 4 shows the architecture of a prior art electoabsorption DAC/optical modulator.

The present invention provides a digital-electronic-to-analog-optical converter comprising two main waveguide paths coupled to each other at a start point and at an end point where each main waveguide path comprises a coupled pair of sub-paths having a first common end and a second common end connected to the start point and end point respectively. The converter further comprises a plurality of modulating signal emitters positioned proximate the sub-paths to modulate an optical wave signal (causing one or more phase shifts) traveling within the sub-path pairs with differential signals generated based on either a differential signal source or the position of the modulating signal emitters relative to the sub-paths. Portions of the optical wave signal travel from the start point through the pair of sub-paths to the end point and said portions interfere (destructively, constructively, or in any suitable intermediate manner) with each other at the end point.

A transmit signal processor (e.g., digital signal processor or DSP) is connected to each of the modulating signal emitters each of which has its own geometry that can be altered such that the bandwidth of all the modulating signal emitters are substantially equal to each other. The modulation resulting from either the differential signals or the positioning of the modulating signal emitters can be a phase modulation of the optical wave signal. The levels of the differential signals of the modulating signal can be adjusted to modulate the phase of the optical wave signal so as to obtain power-of-two phase shifts (or any other types of phase shifts) within each of the sub-paths irrespective of the geometries of the modulating signal emitters. Other suitable (non-power-of-two) phase modulation ratios can also be implemented by electrode design in order to obtain DAC performance with unequally spaced levels, as described in a purely electronic fashion in [8] J. Godin, A. Konczykowska, J.-Y. Dupuy, M. Riet, V. Nodjiadjim, F. Jorge, G. Charlet, O. Bertran-Pardo, J. Renaudier, H. Mardoyan, A. H. Gnauck, and P. J. Winzer, "High Speed Multi-Level Drivers for Spectrally Efficient Optical Transmission Systems", accepted for publication BellLabs Tech. J. (2013); http://onlinelibrary.wiley.com/doi/10.1002/bltj.21628/pdf, see FIG. 6, which is incorporated herein by reference in its entirety. Thus, in [8], which is incorporated herein by reference in its entirety, the levels of the differential signals of the modulating signals can be adjusted to modulate the phase of the optical wave signal so as to obtain a deviating conversion ladder ratio phase shift (irrespective of the geometry of the modulating signal emitters) that enables automatic pre-distortion in the modulating signal and thus in the modulated optical wave. Each of the modulating signal emitters has a geometry, which can be altered (which alteration can be optimal for certain circumstances) such that their bandwidths can be made substantially equal to each other and thus can be linearly equalized as necessary.

In addition, each electrode may further be partitioned into multiple phase shifting electrodes in arranged series such that multiple parallel electrical drive signals contribute to the phase shift within one arm of the complex I/Q vector modulator. As a result, the phase modulation signals can be generated without the use of external driver amplifiers allowing the use of certain relatively low power consumption technologies such as CMOS technology.

In one embodiment, the digital-electronic-to-analog-optical-converter of the present invention has a structure that is consistent with an I/Q super-Mach-Zehnder interferometer whose upper (I) and lower (Q) arms are put into quadrature (90° out of phase with each other) with the use of a 90° bias electrode. Each of the arms of the I/Q super-Mach-Zehnder comprises a sub-Mach-Zehnder modulator implemented as a chirp free push-pull modulator either through the use of inverted drive signals for the electrodes or through the design and positioning of the electrodes that emit the modulation signals and which are positioned proximate the waveguide paths of the sub-Mach-Zehnder modulator.

In particular a Digital Signal Processor generates the modulation signals, which are passed through differential driver amplifiers whose outputs are connected to the electrodes positioned proximate each of the waveguide paths of each sub-Mach-Zehnder modulator. The outputs of the differential driver amplifiers provide balanced modulation signals that are inverted with respect to each other to meet any need or requirement for push-pull modulation signal. The modulation signals from the DSP can be digital, analog, or discrete time signals obtained from sampling an analog signal. The electrodes can be designed such that their bandwidths can be made substantially equal to each other, and thus can be linearly equalized as needed. Different digital drive signal levels can be used to obtain a chain of power-of-two phase shifts within each modulator irrespective of individual lengths of the electrodes. Any other suitable electrode ladder with non-power-of-two ratios may be obtained as well through the proper application of digital drive signal levels irrespective of the individual geometries (e.g., lengths) of the electrodes. For example, a deviating conversion ladder ratio can be obtained, that enables automatic pre-distortion in the modulating signal and thus in the modulated signal irrespective of the geometries (e.g., lengths) of each of the electrodes. A quantization bit can be generated using several electrodes so that multiple electrodes contribute to the phase shift of that one quantization bit. Because several electrodes can be combined to generate the voltage level of one quantization bit, the need for differential amplifiers can be eliminated. As a result, relatively low power consumption technologies such as CMOS technology can be used to construct the modulator and the overall digital-electronic-to-analog-optical converter of the present invention.

The phase modulation caused by the electrodes can be realized through various parameters such as electrode geometry (e.g., length of an electrode), material choices to affect RF and optical group and phase velocities, or the amplitude level of the applied modulation signal. Any one or any combination of two or more of these parameters can be used to produce a phase shift. Further, as will be discussed infra, consecutively positioned electrodes of equal lengths can be operated as if they are one electrode (i.e., the same signal is applied to a group of electrodes simultaneously); this approach is particularly useful when the modulating signal is a digital signal so that multiple parallel drive signals can contribute to the phase shift of one quantization bit.

Figure 5:
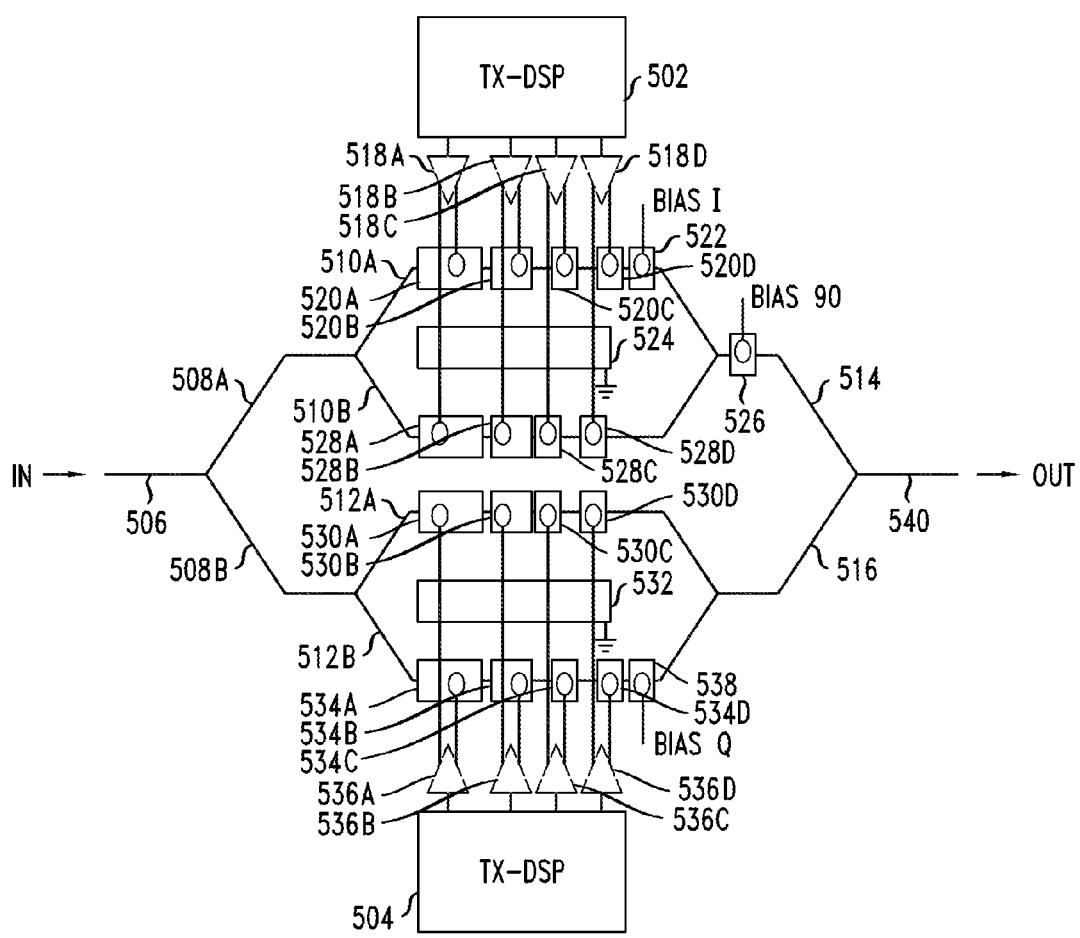
FIG. 5 shows one embodiment of the architecture for the multi-electrode DAC/Modulator of the present invention.

Referring to FIG. 5, there is shown one embodiment of the present invention. FIG. 5 shows a super Mach-Zehnder digital-electronic-to-analog-optical converter 500 that combines the functionalities of a DAC and an optical I/Q vector modulator. For simplicity of expression the digital-electronic-to-analog-optic converter will hereinafter be referred to as a "converter" and is not to be confused with a Digital to Analog Converter, which will be called a DAC. The operation and structure of the converter will be explained in the context of how it processes an optical wave signal applied to the input, viz., into waveguide path 506. The terms "path" or "waveguide path" will be used interchangeably and are understood to mean a waveguide for the optical wave signal applied to the converter of the present invention. For ease of explanation, the optical wave signal is assumed to be a collimated monochromatic electromagnetic sinusoid of sufficiently high frequency to justify referring to such a signal as an optical wave. It will also be assumed that the optical wave signal is coupled to the input of waveguide path 506 either through an optical fiber media or directly from another waveguide device. Path 506, as with all the other paths that constitute the well known Mach-Zehnder tree structure, are wave guides channeled through a substrate of a crystalline material such as Lithium Niobate (LiNbO$_3$), or a substrate made from semiconductors materials such as Gallium Arsenide (GaAs) or Indium Phosphide (InP).

The optical wave signal is divided at the junction of waveguide paths 508A and 508B. Path 508A is connected to the upper arm of the converter 500 and path 508B is connected to the lower arm of the converter 500. The structure constituting each arm can be referred to as a sub-Mach-Zehnder modulator. The upper arm comprises paths or sub-arms 510A and 510B each with four electrodes (520A, 520B, 520C, 520D and 528A, 528B, 528C, 528D respectively) of different lengths positioned proximate the paths (510A and 510B) as shown and said sub-paths 510A and 510B are coupled to each other at one end to path 508A and at the other end to path 514. A Y-branch coupler or any other suitable optical coupling structure, such as a multi-mode interference coupler (MMI), may be used to couple paths 510A and 510B at both ends. A Transmit Digital Signal Processor 502 (TX DSP) provides the modulating signal to differential driver amplifiers 518A, 518B, 518C, 518D whose outputs are connected to electrodes 520A-520D and 528A-528D respectively. The modulating signals, although differential signals, may be digital, analog, or discrete time signals. On path 510A, there is an additional bias electrode 522, which is used to bias overall phase shift experienced by the optical wave signal. Unlike the other electrodes on path 510A, this bias electrode is continuously providing an essentially constant bias voltage and may be dithered and/or changed to make bias adjustments to the converter 500.

The differential drivers are used to virtually eliminate the occurrence of chirp signals, which can cause signal distortions. The differential drivers are optional in that the TX-DSPs 502 and 504 can generate the differential signals. It is well known that for a converter having a Mach-Zehnder structure, when the modulating signals applied to each paths of the sub-Mach-Zehnder structure (i.e., paths 510A and 510B) are inverted, the occurrence of chirp is virtually eliminated, as is well known in the art, see for example [9] *Advanced Optical Modulation Formats*, PROCEEDINGS OF THE IEEE| Vol. 94, No. 5, May 2006, Peter J. Winzer and Rene Essiambre, p. 958, eq. (1), which is incorporated herein by reference in its entirety. The realization of the out-of-phase EM fields between modulation signal electrodes (520A, 520B, 520C, 520D and 528A, 528B, 528C and 528D) in relationship to ground electrode 524 for the sub-Mach-Zehnder structure of upper arm 508A of converter 500 can be seen when a cross section view of the upper arm is analyzed.

Figure 8:
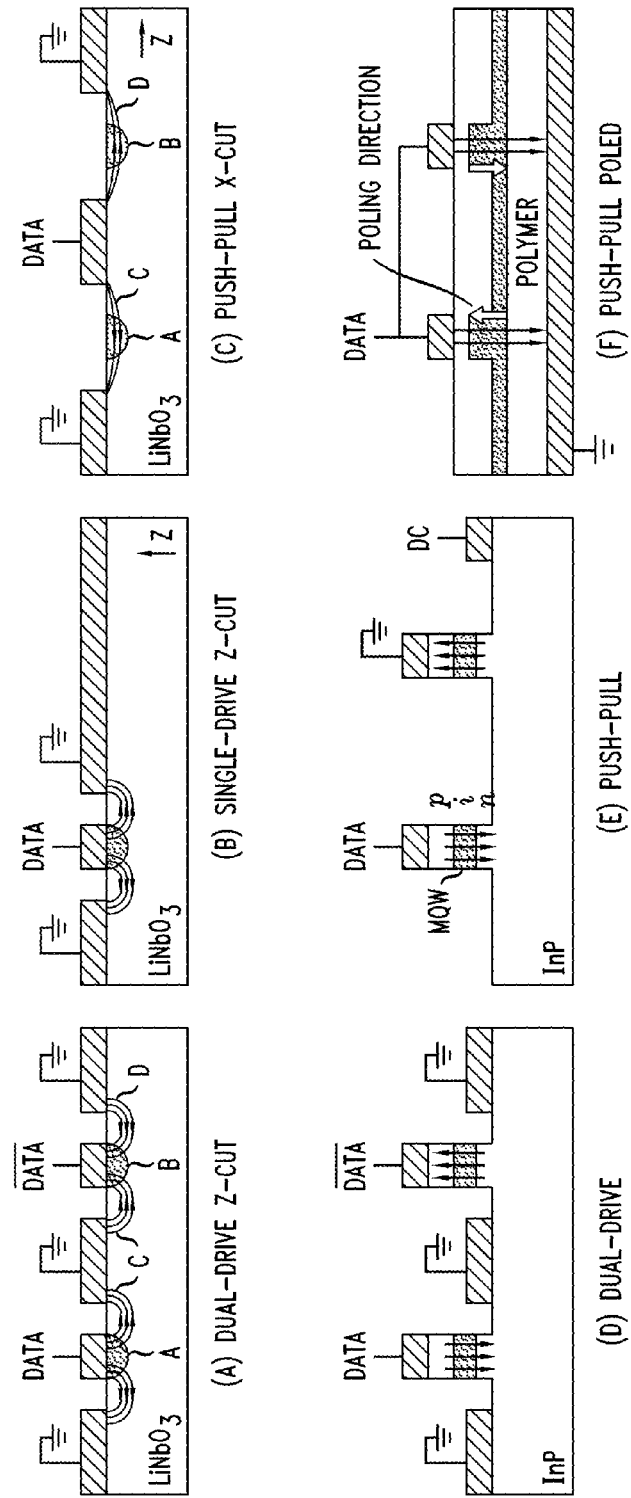
FIG. 8 shows various electrode and waveguide implementations of the present invention.

Referring temporarily to FIG. 8(*a*), there is shown a "Dual-drive z cut" electrode positioning arrangement relative to the optical waveguides A and B showing the polarity of the EM (Electro-Magnetic) fields C generated by the modulation voltage (Data and $\overline{\text{Data}}$) at the signal electrodes are opposite to each other ("inverted" or, if the RF signal is a simple sine wave, "out of phase by 180°"). The signals applied to the electrodes are assumed to be either digital, analog or discrete time signals, or signals riding on an RF (Radio Frequency) carrier. As shown, the polarity of the EM field lines C at waveguide A is directly opposite the polarity of EM field lines D at waveguide B. The center ground electrode in FIG. 8(*a*) corresponds to ground electrode 524. Waveguide A of FIG. 8(*a*) corresponds to waveguide path 510A of FIG. 5. Waveguide B corresponds to an electrode on waveguide path 510B. The "z" and "x" refer to the crystal axes of Lithium Niobate. Depending on how one cuts a slither off the crystal, one would cut along either of these axes.

Referring back to FIG. 5, the operation of lower arm 508B and its corresponding sub-Mach-Zehnder modulator comprising paths 512A and 512B, electrodes 530A, 530B, 530C, 530D, electrodes 534A, 534B, 534C, 534D, bias electrode 538, ground electrode 532, differential drivers 536A, 536B, 536C, 536D, and TX-DSP 504 is essentially the same as the operation of the upper arm 508A as discussed above. The optical wave signals traveling within waveguide paths 510A and 510B interfere with each other at path 514 and are provided with a 90° bias phase shift with respect to the optical wave signals from lower arm 508B; this is because the two main arms (508A and 508B) should have a quadrature phase relationship with respect to each other. The optical wave signals from the upper and lower arms interfere with each other at the junction of paths 514 and 516 resulting in a modulated optical signal which exits through path 540.

Continuing with FIG. 5, it is noted that the lengths of the different electrodes are different (even though corresponding electrodes have matching lengths) revealing a feature of the converter of FIG. 5 of the present invention whereby the length of each said electrodes can be individually altered (which alteration may be optimal for certain circumstances) so that the bandwidth of each of said electrodes can be made substantially equal and hence can be linearly equalized as required. For example, for the upper modulator of FIG. 5, electrodes on the upper path of 510A of the upper modulator are 520A, 520B, 520C and 520D—all of which have different lengths. Their corresponding electrodes on the lower path 510B of the same upper modulator match their corresponding upper path modulator but they all have different lengths relative to each other; that is, electrodes 528A, 528B, 528C and 528D all have different lengths relative to each other.

Figure 6:
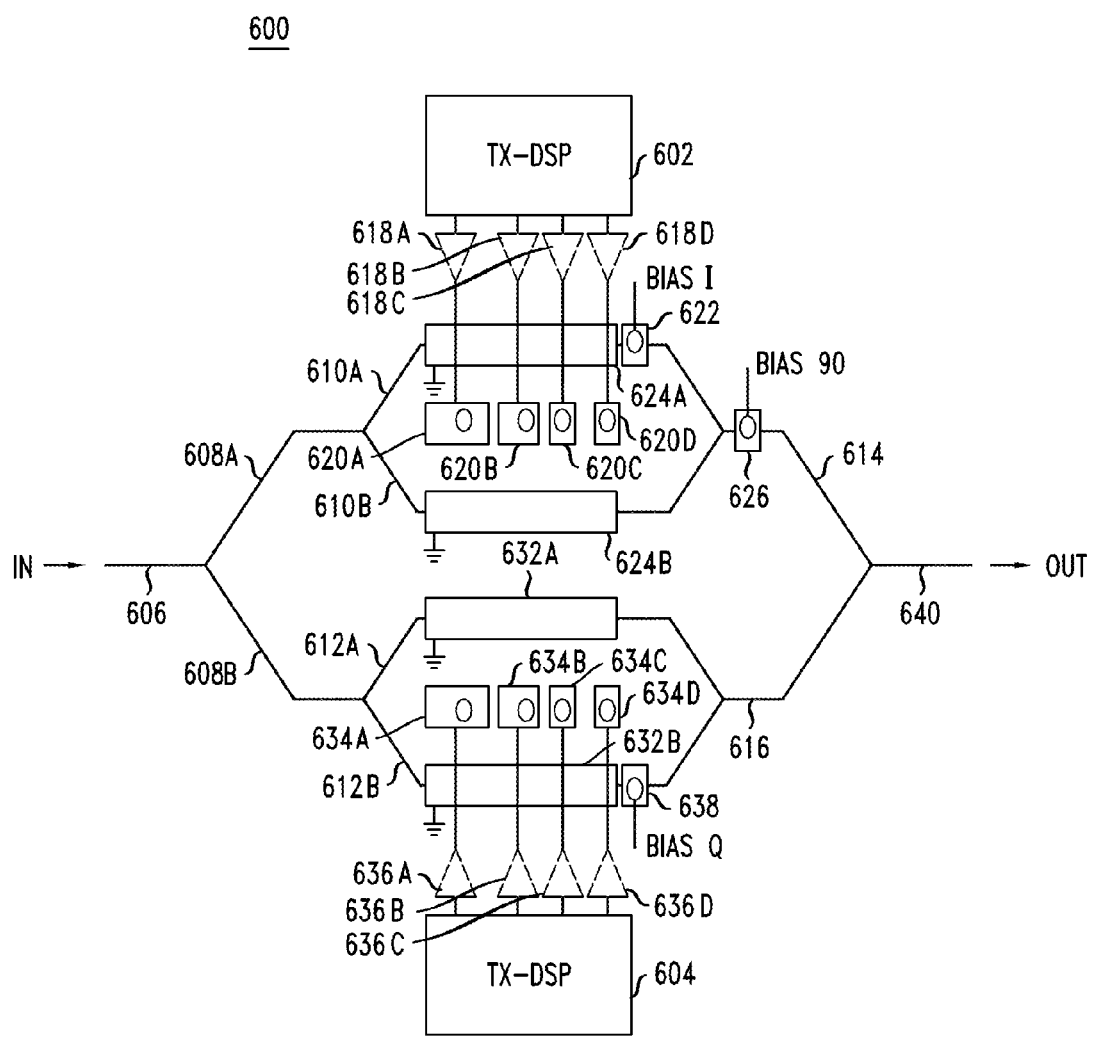
FIG. 6 shows another embodiment of the present invention.

Referring now to FIG. 6, another embodiment of the converter of the present invention is shown. Converter 600 has a different electrode waveguide arrangement than the converter of FIG. 5. In particular, the electrodes 620A, 620B, 620C and 620D are positioned between the paths of the sub-Mach-Zehnder modulator of upper arm 608A (i.e., paths 610A and 610B). The same arrangement exists for the lower arm 608B wherein electrodes 634A, 634B, 634C, and 634D are positioned between the paths 612A and 612B. Ground electrodes 624A, 624B for the upper arm and 632A and 632B for the lower arm are positioned proximate the respective waveguide paths 610A, 610B of the upper arm and 612A, 612B of the lower arm of the converter 600. Bias electrodes 622 and 638 are also used in this converter. Also, electrode 626 provides a 90° phase shift between the upper and lower arms of the converter 600.

Referring temporarily to FIG. 8(*c*), a particular electrode and waveguide arrangement consistent with that of FIG. 6 is shown. The center signal electrode of FIG. 8 corresponds to any one of the electrodes of FIG. 6 that is connected to an output of a driver amplifier (618A, 618B, 618C, 618D) of the upper arm 608A or a driver amplifier (636A, 636B, 636C, 636D) of the lower arm 608B. It is important to note that the amplifiers of FIG. 6 are not differential amplifiers; this is because the EM field lines C passing through the waveguide A emanate from the central electrode to waveguide A. However, the EM fields passing through waveguide B also emanate from the central electrode to waveguide B. Thus, the two waveguides have EM fields that are oppositely oriented, which is the necessary condition for eliminating the likelihood of chirp signals. Because of the particular arrangement of the set of electrodes of FIG. 6 with respect to the waveguides of the upper and lower arms (608A and 608B), differential amplifiers are not required. Moreover, if TX-DSP 604 or 602 can provide a sufficiently robust modulating signal, the use of amplifiers can be eliminated altogether; this would reduce costs and power consumption of the converter. The optical wave inputted at path 606 and divided at the junction of paths 608A and 608B interfere with each other (destructively, constructively, or in any suitable interference state) at the junction of paths 614 and 616 and exit converter 600 via path 640.

Thus, the sub-Mach-Zehnder modulator of the converters of FIG. 6 of the present invention are equivalent to and operates as a push pull modulator (without the use of differential driver amplifiers) by virtue of the positioning of its electrodes relative to the waveguide paths of the modulator.

It is noted that the converter of FIG. 6 discussed above has electrodes of different lengths. The converter of FIG. 5 also has different length electrodes. Thus applying the same modulating signal to all of the electrodes will result in different phase shifts for each electrode. However as has already been discussed, the phase shift is also a function of signal level. To compensate for the different electrode lengths, the signal levels can be adjusted to obtain a desired phase shift. For example, to obtain a power-of-two-phase shifts (thus having the modulator perform a DAC function), different signal levels would have to be applied to the different electrodes to obtain the desired phase relationship between the electrodes irrespective of the individual phase shift geometry (e.g., length of the electrode) of the electrodes.

Figure 7:
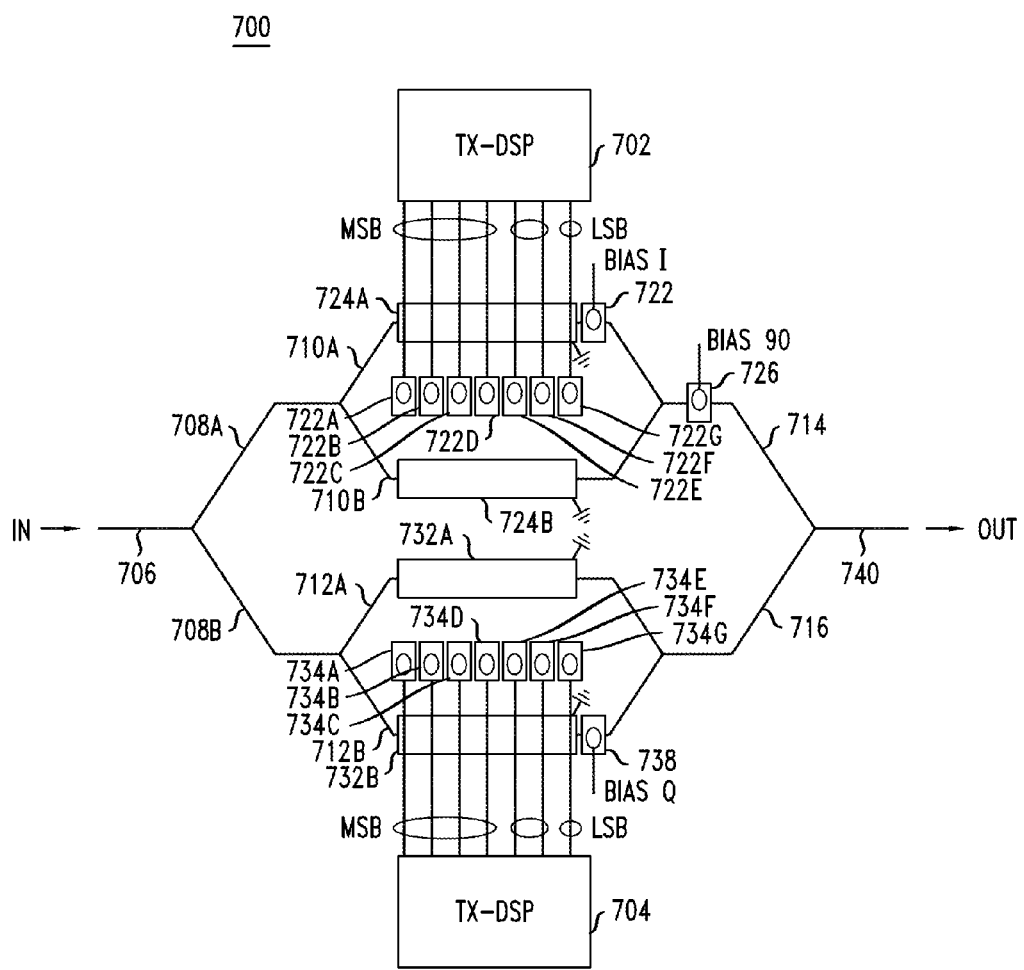
FIG. 7 shows yet a third embodiment of the present invention.

Referring now to FIG. 7, a converter with a similar electrode arrangement to FIG. 6 is shown. Unlike FIG. 6, however, no amplifiers are used at the outputs of the TX-DSP 704 and 702. The output of the TX-DSPs 702, 704 are typically digital. Although 7 outputs are shown, the entire output actually represents a 3-bit signal. This is because four electrodes (734A, 734B, 734C and 734D) connected to TX-DSP 704 and four electrodes (722A, 722B, 722C, and 722D) connected to TX-DSP 702 are operated as one bit, specifically as the MSB (Most Significant Bit). Thus, the four electrodes contribute to the phase shift of one quantization bit. Also, each quantization bit can be further partitioned into multiple phase shifting electrodes. Thus, instead of using an amplifier to realize the proper phase shift, one can combine electrodes to provide sufficient signal power to obtain the proper phase shift. Such an approach potentially allows for operation of the modulator without amplifiers. The next two electrodes (722E and 722F) represent the next most significant bit and the LSB (Least Significant Bit) is represented by electrode 722G. The same approach is used for the sub-Mach-Zehnder modulator of the lower arm. That is, electrode 734E and 734F represent the next most significant bit and electrode 734G represents the LSB. The electrodes for the lower arm are placed between ground electrodes 732A and 732B. The electrodes for the upper arm are placed between ground electrodes 724A and 724B. Any other suitable electrode arrangement, examples of which are given in FIG. 8, can also be used. It should be noted that the TX-DSPs 702, 704 can provide different types of modulating signals even when operating with no amplifiers as shown in FIG. 7. The modulating signals can be analog, digital or discrete time signals.

Other than the use of multiple electrodes to represent one bit of a digital signal, and having electrodes of equal lengths, the converter 700 of FIG. 7 operates in a fashion similar to the converters of FIGS. 5 and 6. In particular, input path 706 splits into an upper arm 708A and a lower arm 708B. The upper arm is coupled to sub-Mach-Zehnder modulator having waveguide paths 710A and 710B with the electrodes and ground electrodes arranged to provide a push pull relationship thus possibly enabling operation without the use of driving differential amplifiers. The lower arm is coupled to a sub-Mach-Zehnder modulator having waveguide paths 712A and 712B. Bias electrodes 722 and 738 are used to provide adjustments to the phase shifts for each modulator. A 90° essentially constant phase shift is provided to path 714 of the upper arm with electrode 726 to establish the quadrature relationship between the lower and upper arms. The two portions of the input signal after having propagated through both modulators interfere with each other at the junction of paths 714 and 716 and the resulting modulated optical wave exits through path 740.

Referring back to FIG. 8, FIG. 8(*b*) shows a single drive z-cut modulator. The term "z-cut" refers to a crystal axis of Lithium Niobate ($LiNbO_3$). The modulator of FIG. 8(*b*) has a GSG coplanar electrode structure. The GSG refers to the (G) or ground electrode and the (S) or signal electrode residing in a single plane to form GSG microwave structures. These are well suited for coupling to available high-speed electrical driver amplifiers. FIGS. 8(*a*), 8(*b*) and 8(*c*) represent $LiNbO_3$ devices where in all such implementations the dominant component of the modulating electric fields is kept parallel to the z-axis of the $LiNbO_3$ crystal. FIGS. 8(*d*) and 8(*e*) show semiconductor implementations (e.g., based on InP), where the phase modulators employ the QCSE (quantum-confined Stark effect) in a PIN (Positive Intrinsic Negative) or NIN (n-doped-intrinsic-n-doped)-structure encompassing an MQW (multiple quantum well) layer; see [10] R. A. Griffin, "Integrated DQPSK Transmitters," Prod. OFC, OWE3, 2005, which is incorporated herein by reference in its entirety. The dual-drive implementation of FIG. 8(*d*) is similar to the $LiNbO_3$ (Lithium Niobate) modulator structure of FIG. 8(*a*). Proper DC biasing has to ensure that the PIN-diodes are reverse biased at all times. The push pull implementation in FIG. 8(*e*) uses a conductive n-doped layer in the semiconductor stack as a common electrode to both phase modulators, connecting the two PIN-based phase modulators in series. An inductively coupled DC bias (high resistance at RF) ensures that this conductive layer is on a sufficiently positive DC potential to guarantee reverse biasing of both diodes. FIG. 8(*f*) shows the electrode structure of a polymer modulator. The electro-optically active regions carry optically non-linear chromophores that are poled by a strong electric field during the manufacturing process; see e.g., [11] http://walba.colorado.edu/2002_Chem_6321/reprints/Dalton %20NLO%20Science.pdf. By poling the two modulators in opposite directions, one can implement push-pull modulators that use a single drive signal, similar to x-cut $LiNbO_3$ (FIG. 8(*d*)) or InP (FIG. 8(*e*)).

While various aspects of the invention have been described above, it should be understood that they have been presented by way of example and not by limitation. It will be apparent to persons skilled in the relevant art (s) that various changes in form and detail can be made herein without departing from the spirit and scope of the present invention. Thus, the present invention should not be limited by any of the above-described exemplary aspects, but should be defined only in accordance with the following claims and their equivalents.

What is claimed is:

1. An apparatus comprising:
    at least two main waveguide paths coupled to a start point and to an end point where each main waveguide path comprises a coupled pair of sub-paths having a first common end and a second common end connected to the start point and the end point respectively;
    a plurality of modulating signal emitters positioned proximate the sub-paths to modulate with a modulating signal an optical wave signal traveling within the sub-path pairs; and
    a transmit signal processor coupled to the modulating signal emitters and configured to drive each of the modulating signal emitters from the plurality of the modulating signal emitters to modulate a multibit digital optical signal;
wherein the digital signal processor is configured to drive one or more of the modulating signal emitters to modulate a bit of a first significance of the multibit digital optical signal and to drive a plurality of electrodes to modulate a bit of a second significance of the multibit digital optical signal, the second significance being different from the first significance.

2. The apparatus of claim 1, wherein each one of the modulating signal emitters from the plurality of the modulating signal emitters is an electrode.

3. The apparatus of claim 2, wherein at least some of the electrodes have respective lengths that are equal to each other.

4. The apparatus of claim 1, wherein each one of the modulating signal emitters of the plurality of the modulating signal emitters is configured to modulate the multibit optical wave signal by causing a phase shift of a bit of the digital multibit optical signal.

5. The apparatus of claim 1, further configured to partition a quantization bit of the digital optical signal into multiple modulating signal emitters such that multiple modulating signal emitters contribute to the phase shift of the optical wave signal.

6. The apparatus of claim 1, wherein the two main waveguide paths, the sub-paths and the modulated signal emitters constitute a structure consistent with an I/Q super Mach-Zehnder interferometer and each of the coupled sub-paths and the modulating signal emitters constitute a sub-Mach-Zehnder modulator having a push-pull feature implemented with one of differential drive signals and positioning of the modulating signal emitters and further where such modulating signal emitters are electrodes each having a certain geometry.

* * * * *